US012595831B2

(12) United States Patent
Plewnia et al.

(10) Patent No.: US 12,595,831 B2
(45) Date of Patent: Apr. 7, 2026

(54) ELECTROMECHANICAL BRAKE HAVING A GAS-CONTAINING PISTON CHAMBER

(71) Applicant: ZF Active Safety GmbH, Koblenz (DE)

(72) Inventors: Heinrich Plewnia, Niederhofen (DE); Werner Seibert, Kammerforst (DE); Markus Mallmann, Pfalzfeld (DE); Volker Knop, Ulmen (DE)

(73) Assignee: ZF Active Safety GmbH, Koblenz (DE)

( * ) Notice: Subject to any disclaimer, the term of this patent is extended or adjusted under 35 U.S.C. 154(b) by 662 days.

(21) Appl. No.: 17/698,280

(22) Filed: Mar. 18, 2022

(65) Prior Publication Data

US 2022/0299080 A1      Sep. 22, 2022

(30) Foreign Application Priority Data

Mar. 19, 2021    (DE) .......................... 102021106812.6

(51) Int. Cl.
*F16D 65/18* (2006.01)
*F16D 55/226* (2006.01)
(Continued)

(52) U.S. Cl.
CPC ........... *F16D 65/18* (2013.01); *F16D 55/226* (2013.01); *F16D 2121/04* (2013.01);
(Continued)

(58) Field of Classification Search
CPC .... F16D 65/18; F16D 2121/24; F16D 55/226; F16D 2121/04; F16D 2125/06;
(Continued)

(56) References Cited

U.S. PATENT DOCUMENTS

2024/0208479 A1*   6/2024   Knop .................... B60T 17/002

FOREIGN PATENT DOCUMENTS

DE        19712209  A1    10/1998
DE     102017214859  A1     2/2019
(Continued)

OTHER PUBLICATIONS

German Patent No. DE 19826373 to Schumann et al published Dec. 16, 1999.*

(Continued)

*Primary Examiner* — Pamela Rodriguez
(74) *Attorney, Agent, or Firm* — Brooks Kushman, P.C.

(57) ABSTRACT

The disclosure relates to an electromechanical brake for a motor vehicle. The electromechanical brake comprises an actuating piston which is set up to be moved translationally in a direction of a piston axis in order to actuate at least one brake shoe. The electromechanical brake also comprises a brake carrier having a gas-containing piston chamber in which the actuating piston is received such that it can be moved translationally in a direction of the piston axis. Furthermore, the electromechanical brake comprises an electric motor for driving the actuating piston. In the case of the electromechanical brake, a venting device is provided, which is set up to vent the piston chamber with respect to an exterior. The disclosure also relates to a disc brake, to a brake system, and to a motor vehicle.

19 Claims, 4 Drawing Sheets

(51) Int. Cl.

| | | |
|---|---|---|
| *F16D 121/04* | (2012.01) | |
| *F16D 121/24* | (2012.01) | |
| *F16D 123/00* | (2012.01) | |
| *F16D 125/06* | (2012.01) | |

(52) U.S. Cl.
CPC ...... *F16D 2121/24* (2013.01); *F16D 2123/00*
(2013.01); *F16D 2125/06* (2013.01)

(58) Field of Classification Search
CPC .. F16D 2125/40; B60T 13/174; B60T 13/741;
B60T 1/065; B60T 13/26; B60T 17/002
See application file for complete search history.

(56) References Cited

FOREIGN PATENT DOCUMENTS

| | | | |
|---|---|---|---|
| DE | 102018213850 | A1 | 2/2020 |
| EP | 2762371 | A1 | 8/2014 |
| WO | 1998042553 | A1 | 10/1998 |

OTHER PUBLICATIONS

Korean Patent No. KR 20180047862 to Ahn published on May 10, 2018.*
German Patent No. DE 10347115 to Vohla et al published on Jun. 2, 2005.*
German Patent No. DE 102019219811 to Tabata et al published on Jun. 17, 2021.*
Translation of German Patent No. DE 19712209 obtained from website: https://worldwide.espacenet.com on Aug. 27, 2024.*

* cited by examiner

ELECTROMECHANICAL BRAKE HAVING A GAS-CONTAINING PISTON CHAMBER

CROSS-REFERENCE TO RELATED APPLICATION

This application claims priority to German Priority Application No. 102021106812.6, filed Mar. 19, 2021, the disclosure of which is incorporated herein by reference in its entirety.

TECHNICAL FIELD

The disclosure relates to an electromechanical brake. The disclosure also relates to a disc brake, to a brake system for a motor vehicle, and to a motor vehicle.

BACKGROUND

Electromechanical brakes (EMBs) are ideal for use in vehicle brakes, in particular if the underlying motor vehicle is an electric vehicle. EMBs usually do not require hydraulics. Rather, the braking force is generated directly on the wheels. For this purpose, the EMBs comprise an actuating actuation chain which usually has an electric motor, a gear mechanism, and an actuating piston which is received in a piston chamber such that it can be moved translationally. In the event of a braking operation, the electric motor executes a rotating drive movement via its output shaft, which is converted into a translational drive movement by the gear mechanism and serves to drive the actuating piston and above it to operate a brake shoe, which is pressed against a brake disc of a wheel brake, for example.

In the case of electromechanical brakes, the actuating piston is usually received in a gas-tight manner in a piston chamber in order to avoid penetration of dirt or similar contaminants into the piston chamber and thus to counteract a possible impairment of the function of the EMB. However, this results in a change in gas pressure in the piston chamber when a temperature change and/or a piston movement takes place. It has been shown that, in the long run, such changes in the gas pressure can result in premature wear of components of the electromechanical brake.

SUMMARY

What is needed is an electromechanical brake that has at least one measure to counteract premature wear in an electromechanical brake.

An electromechanical brake is proposed herein.

In one exemplary arrangement, a basic electromechanical brake is proposed, which is suitable, for example, for use in a wheel brake of a motor vehicle, that comprises an actuating piston. In one exemplary arrangement, the actuating piston is set up to be moved translationally in the direction of a piston axis, for example in order to actuate a brake shoe. The electromechanical brake also comprises a brake carrier having a piston chamber, in one exemplary arrangement containing gas, for the actuating piston. In one exemplary arrangement, it is provided that the actuating piston is received in the piston chamber such that it can be moved translationally in the direction of the piston axis. For example, the actuating piston is received in the piston chamber in such a way that an outer circumference of the actuating piston is gas-tight or largely gas-tight with respect to a corresponding circumferential wall of the piston chamber. For this purpose, a sealing surface and/or a separate sealing element can be provided. In one exemplary arrangement, the gas contained in the piston chamber is air, and in one exemplary arrangement, atmospheric air.

The electromechanical brake also comprises, for example, an electric motor for driving the actuating piston. In one exemplary arrangement, the electromechanical brake also comprises a gear mechanism which is interposed, for example, between the electric motor and the actuating piston. For example, the gear mechanism is set up to convert a rotary movement outgoing from an output shaft of the electric motor into a translational drive movement for driving the actuating piston. For example, the gear mechanism may comprise a lifting gear for this purpose. In one exemplary arrangement, the brake carrier is set up to carry the actuating piston and/or the electric motor and/or the gear mechanism.

In the present description, the term "electromechanical brake" is to be understood as a brake which uses electrical and mechanical processes to exercise a brake function. For example, the electric motor is used to generate the drive force or drive movement for actuating the brake, for example by moving the actuating piston, and in one exemplary arrangement, translationally, in the piston chamber. In the following, the electromechanical brake is also referred to as "brake" for short.

In the present description, the term "electric motor" is to be understood to mean any type of drive that is driven with the aid of electrical energy. The term "electric drive" or "electric motor" can be understood as a synonym for the term "electric motor."

In one exemplary arrangement, the electromechanical brake comprises a venting device for venting the piston chamber with respect to an exterior. As a result, a measure is taken to counteract premature signs of wear on components of the electromechanical brake. This is because the venting device can be used to achieve or promote ventilating or venting of the electromechanical brake for the purpose of pressure equalization between the piston chamber and the exterior. A component load due to pressure changes in the piston chamber, which is caused, for example, by the translational movement of the actuating piston and/or a temperature change or a temperature switch, is thereby effectively counteracted.

In the present description, the term "exterior" is to be understood as a gas-containing space or environment in which there is atmospheric pressure or approximately atmospheric pressure. In one exemplary arrangement, the gas is air, in particular atmospheric air. In principle, the gas in the exterior can also have a pressure different from atmospheric pressure. In one exemplary arrangement, the gas in the exterior is pressurized, for example, at a constant or approximately constant pressure, in order to be used by the venting device for venting or ventilating the piston chamber of the electromechanical brake.

In a further exemplary arrangement, the venting device comprises a venting opening which is assigned to a brake carrier, for example. In one exemplary arrangement, the venting opening is provided on the brake carrier, for example formed thereon. In one exemplary arrangement, the venting opening is flow-connected to the exterior on the one hand and to the piston chamber on the other hand, via a flow passage, such as a flow channel or a flow line, for example. This promotes a technically simple production of the venting device.

A filter element can be assigned to the venting opening, for example in order to at least partially prevent dirt particles and/or moisture particles from penetrating into the piston chamber. A valve, for example in the form of a membrane or a two-way valve, can also be provided, for example assigned to the venting opening, in order to control a gas exchange between the piston chamber and the exterior.

According to one exemplary arrangement, the electromechanical brake comprises an actuator housing. For example, the actuator housing serves as an enclosure for the electric motor. In addition, or as an alternative, the actuator housing can also serve as an enclosure for the gear mechanism. The actuator housing promotes protection with respect to external influences, such as moisture and/or dirt, for example. In particular, the actuator housing is arranged on the brake carrier with the formation of an interior. For example, the actuator housing forms a shell in order to protect the contents located in the interior with respect to external influences, such as moisture and/or dirt, for example.

In a further exemplary arrangement, it is provided that the venting opening is arranged on a portion of the brake carrier which is located outside the interior of the actuator housing. As a result, the venting opening is relatively easily accessible. Alternatively, the venting opening can be arranged on a portion of the brake carrier which is located within the interior of the actuator housing. As a result, the venting opening benefits from the protective function of the actuator housing.

If the venting opening is located within the interior of the actuator housing, it is advisable that the actuator housing has at least one opening to the exterior and/or is fastened to the brake carrier in a gas-permeable manner, for example in order to effect a gas exchange with the exterior. This promotes pressure equalization between the interior of the actuator housing and the exterior. In particular, the opening of the actuator housing is in direct and/or immediate operative contact with the exterior.

A filter element can be assigned to the at least one opening, for example in order to at least partially prevent dirt particles and/or moisture particles from penetrating into the interior of the actuator housing. A valve, for example in the form of a membrane or a two-way valve, can also be provided, in particular assigned to the at least one opening, in order to control the gas exchange between the piston chamber and the exterior.

In a further exemplary arrangement, the venting device comprises a venting line. In particular, the venting line is intended to be laid in a vehicle interior. This allows the ventilation or venting of the piston chamber via the vehicle interior. In this way, the entry of dirt and/or moisture or other function-impairing contaminants into the piston chamber can be counteracted, in particular avoided. The venting line can be or have a flexible line. The venting line can also be or have a rigid line. For example, the venting line is constructed of plastics material or metal or has such a material. For example, the venting line may be constructed of rubber or has such a material.

In the present description, the term "vehicle interior" is to be understood as meaning, in particular, a space in a motor vehicle that is protected from function-impairing influences or other external influences, in particular from water or moisture, and/or dirt. The vehicle interior can be the passenger compartment of the motor vehicle. The vehicle interior can also be the engine compartment of the motor vehicle, in particular a protected region of the engine compartment. Furthermore, the vehicle interior can be the trunk of the motor vehicle. In particular, the vehicle interior forms the exterior described above and/or the interior is a component of the exterior described above.

It can be provided that the venting line is flow-connected, in one exemplary arrangement, at one end, to the interior of the actuator housing. This facilitates a technically simple connection of the venting line. For example, the venting opening is arranged within the interior in order to allow a flow connection and thus a pressure equalization between the piston chamber and the exterior, in which, for example, a free end of the venting line is located or can be laid.

A filter element can be assigned to the venting line, in one exemplary arrangement, to the free end or the inlet of the venting line, for example in order to at least partially prevent dirt particles and/or moisture particles from penetrating into the venting line. A valve, for example in the form of a membrane or a two-way valve, can also be provided, and assigned to the venting line, in order to control the gas exchange between the piston chamber and the exterior.

In one exemplary arrangement, the actuator housing has a connection opening via which the flow connection with the venting line is or can be established. For example, the above-described at least one opening in the actuator housing is used for this purpose, which is thereby in flow connection with the exterior via the venting line.

In one exemplary arrangement, the connection between the venting line and the actuator housing is designed to be sealed to the outside, in particular to be gas-tight. As a result, a measure is taken to prevent function-impairing contaminants, in particular dirt and/or moisture, from entering the venting path and thus into the piston chamber and/or the actuator housing. For example, the connection is a releasable connection.

In a further exemplary arrangement, the venting line is arranged along an electrical power cable. As a result, a line path provided by the power cable is used to lay the venting line. In one exemplary arrangement, the venting line is integrated into the electrical power cable. For example, the venting line is one of the individual lines of the power cable and is surrounded by a sheathing of the power cable. As a result, the electrical power cable has a double function. On the one hand, it serves to supply electrical energy and, on the other hand, it is part of the venting device. The electrical power cable is used, for example, for the electrical power supply of the electric motor or another electrical consumer of the electromechanical brake. In this respect, the electrical power cable makes use of a component that is installed or is present in the electromechanical brake anyway.

In a further exemplary arrangement, the electrical cable is electrically connected to a socket, for example of the electric motor, via a plug. For example, the plug has a plurality of contact elements for making electrical contact with corresponding counter elements of the socket. For example, a tube is arranged between them, which is flow-connected on the one hand to the venting line and on the other hand to the interior of the actuator housing. As a result, in the case of a detachable connection between the electrical power cable and an electrical consumer, in particular a plug-and-socket connection, it can be used for ventilating or venting in a technically simple manner. The tube can be made of plastics material or have plastics material.

The free end or the inlet into the venting line can be provided with a filter element, for example in order to at least partially prevent dirt particles and/or moisture particles from penetrating into the venting line. A valve, for example in the form of a membrane or a two-way valve, can also be provided in order to control the gas exchange between the piston chamber and the exterior.

The electromechanical brake can be set up to execute an immobilization brake function. Additionally or alternatively, the electromechanical brake can be set up to execute a service brake function. In the present description, the term "service brake function" is to be understood in particular as a function by which a vehicle equipped with the brake is braked during operation, for example while driving, and/or can be braked to a standstill. Such service braking can be initiated by the vehicle driver, for example by operating the brake pedal, or an automatic driving and/or braking control, such as an adaptive cruise control.

In the present description, the term "immobilization brake function" is to be understood as a function by which a vehicle equipped with the brake is held at a standstill when immobilization braking has taken place. This is to prevent the vehicle from rolling away unintentionally, even if the vehicle is on an inclined roadway. The process of immobilization braking can also be referred to as parking braking. In the present description, the term "immobilization braking" is used as a synonym for the term "parking brake function." The parking brake function or immobilization brake function can also be used for emergency braking of the vehicle. The parking brake function or immobilization brake function therefore also implies an emergency brake function.

According to one aspect, a disc brake for a motor vehicle is provided. The disc brake comprises a brake disc and at least one configuration and/or at least one exemplary arrangement of the electromechanical brake described above. The electromechanical brake is set up to act on the brake disc via the actuating piston and at least one brake shoe. For example, the brake carrier of the electromechanical brake forms a brake caliper of the disc brake. For example, the disc brake is a floating caliper brake. In this case, the brake carrier designed as a brake caliper is a floating caliper.

According to a further aspect, a brake system for a motor vehicle is proposed. The brake system comprises at least one configuration and/or at least one exemplary arrangement of the electromechanical brake described above and/or at least one configuration and/or at least one exemplary arrangement of the disc brake described above. In addition to the electric motor of the electromechanical brake, the brake system also comprises an electronic control device for controlling the electric motor.

In one possible exemplary arrangement, the control device and the electric motor are set up to set a braking force exerted by the at least one brake shoe according to one or more specified values in order to carry out braking. The braking force can be an immobilization braking force. In this case, the braking is immobilization braking or parking braking. Alternatively, the braking force can be a service braking force. In this case, the braking is a service braking.

For example, the specified values are contained in or based on information about the braking request requested by the driver, a driver assistance system or an autonomous driving system and/or the inclination of the roadway and/or the inclination of the road surface and/or about the current driving, deceleration, or acceleration state of the motor vehicle and/or parameters of the motor vehicle, such as the load condition. This allows the braking force exerted by the at least one associated brake shoe to be set in a controlled manner and the braking force can be metered, for example for comfortable braking of the motor vehicle.

According to a further aspect, a motor vehicle is proposed which comprises at least one configuration and/or at least one exemplary arrangement of the electromechanical brake described above and/or the disc brake described above and/or the brake system described above.

For example, the motor vehicle has a vehicle interior. For example, the vehicle interior is the vehicle interior already described above. In one possible exemplary arrangement, the electromechanical brake is designed in such a way that the venting line of the venting device is laid in the vehicle interior. As a result, the inlet of the venting line is housed protected from function-impairing influences or other external influences, in particular from water or moisture, and/or dirt, and at the same time the venting function of the venting device is given.

BRIEF DESCRIPTION OF DRAWINGS

Further details and features of the disclosure can be found in the following description of a plurality of exemplary arrangements with reference to the drawings, in which.

DETAILED DESCRIPTION

Figure 1:
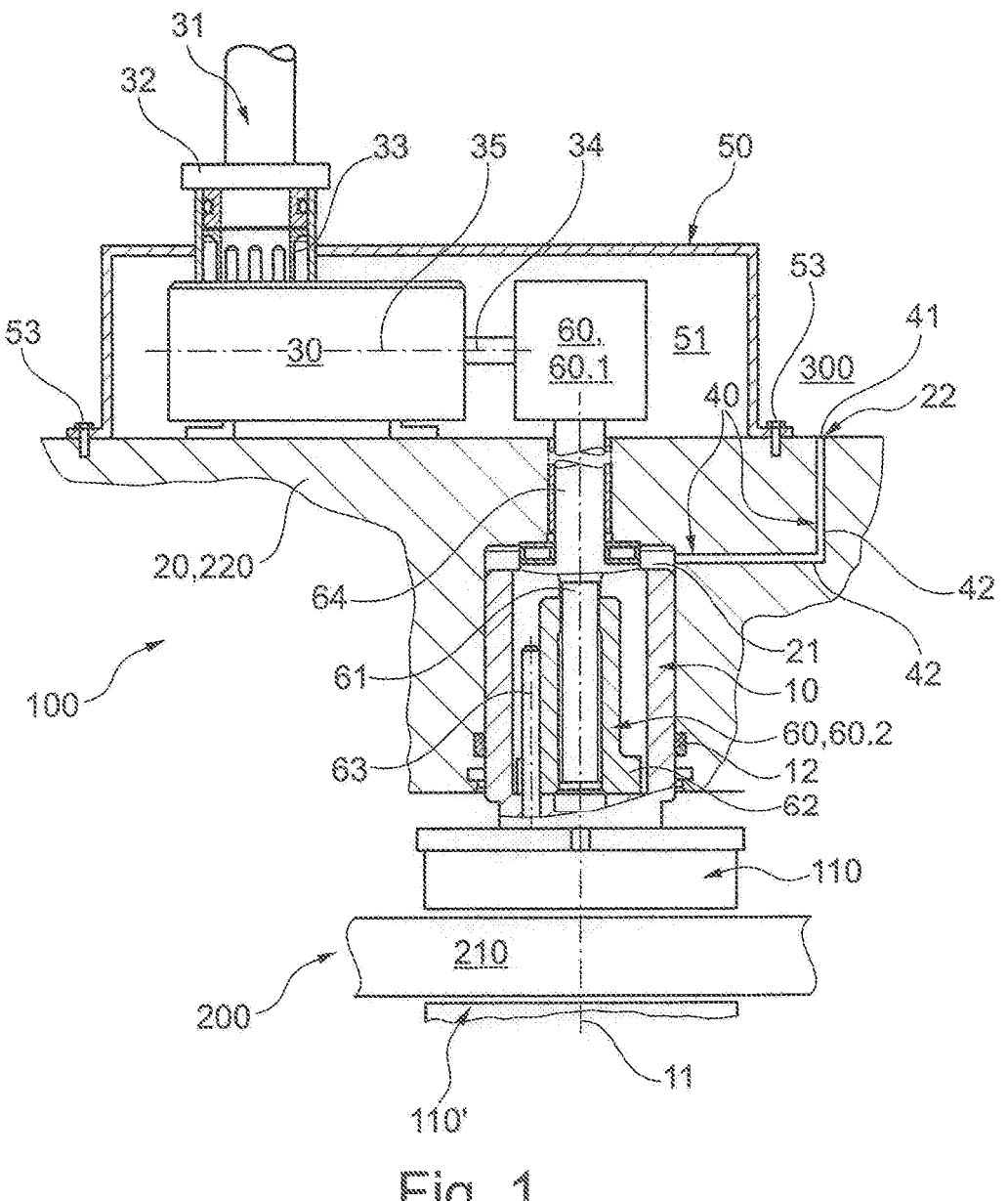
FIG. 1 shows a possible exemplary arrangement of an electromechanical brake with an actuating piston, a piston chamber receiving the actuating piston, and a venting device for venting the piston chamber in a schematic representation as a partial section.

FIG. 1 shows a possible exemplary arrangement of an electromechanical brake 100, which is shown by way of example as a component part of a disc brake 200. The disc brake 200 is, for example, a vehicle brake and can be used in a motor vehicle, for example in a passenger car or a truck.

The disc brake 200 comprises at least two brake shoes 110, 110' arranged at a distance from one another, between which a brake disc 210 is arranged. The brake disc 210 is assigned, for example, to a vehicle wheel, and more specifically connected to the vehicle wheel in a rotationally fixed manner, so that a braking force or application force exerted by the brake shoes 110, 110' on the brake disc 210 develops a braking effect on the vehicle wheel. The disc brake 200 has a brake caliper 220 which carries the brake shoes 110, 110' and which is fastened, for example, on or in a chassis of the motor vehicle. The disc brake 200 is, for example, a floating caliper brake. In principle, the disc brake 200 can also be a fixed caliper brake.

The electromechanical brake 100 is used to actuate at least one of the brake shoes 110, 110', and in one exemplary arrangement, the brake shoe 110. For example, an actuating piston 10 is used for this purpose. In one exemplary arrangement, the electromechanical brake 100 is set up to actuate the at least one brake shoe 110 in order to exercise a service brake function. Additionally, or alternatively, the electromechanical brake 100 can be set up to actuate the at least one brake shoe 110 in order to exercise an immobilization brake function or parking brake function.

The electromechanical brake 100 is based on actuation by an electric drive, and in one exemplary arrangement, an electric motor 30. In one exemplary arrangement, the electric drive is part of an actuator device which is used to drive the actuating piston 10. The actuator device can further comprise a gear mechanism 60. The electric motor 30 comprises, for example, an output shaft 34 and is set up to drive the actuating piston 10 to move the output shaft 34 in rotation about a drive axis 35.

The gear mechanism 60 comprises, for example, a lifting gear 60.2 which is set up to convert a rotary drive movement outgoing from the output shaft 34 into a translational drive movement for driving the actuating piston 10. The actuating piston 10 itself is set up to be moved translationally in a direction of a piston axis 11 in order to move or press the at least one brake shoe 110 in a direction of the brake disc 210.

For example, in one exemplary arrangement, the lifting gear 60.2 is formed by a spindle lifting gear and comprises a threaded spindle 61 and a threaded nut 62 meshing therewith. The threaded nut 62 is assigned to the actuating piston 10 and, by utilizing an anti-twist device 63, serves to carry out the translational drive movement, more specifically, a purely translational drive movement. The threaded spindle 61 forms an inlet of the lifting gear 60.2 and absorbs the rotary drive movement coming from the electric motor 30, which is then converted into the translational drive movement by the thread engagement between the threaded spindle 61 and the threaded nut 62 under the action of the anti-twist device 63.

In the case of the electromechanical brake 100, for example, the piston axis 11 and the drive axis 35 are located transversely to one another, and in one exemplary arrangement, orthogonally to one another. In the case of the electromechanical brake 100, this is implemented by an angular gear 60.1, which is interposed, for example, between the electric motor 30 and the lifting gear 60.2 and is, for example, a component of the gear mechanism 60. The angular gear 60.1 has, for example, an output shaft 64 which is arranged, for example, coaxially to the piston axis 11. The output shaft 64 is connected to the threaded spindle 61 in a rotationally fixed manner.

The electromechanical brake 100 comprises a brake carrier 20, which is used, for example, as a carrier for the actuating piston 10 and/or the gear mechanism 60 and/or the electric drive. In the present disc brake 200, which is equipped with the electromechanical brake 100, the brake carrier 20 is formed, for example, by the brake caliper 220, or the brake caliper 220 also comprises the brake carrier 20 as a component.

The actuating piston 10 is received in the brake carrier 20. The brake carrier 20 has a piston chamber 21 in which the actuating piston 10 is received such that it can be moved translationally in the direction of the piston axis 11. In one exemplary arrangement, the piston chamber 21 is without hydraulic filling, but contains a gas, such as air, in particular atmospheric air. The actuating piston 10 is sealed off with respect to the piston chamber 21. A sealing element 12 is provided, which is arranged on the circumferential side between the actuating piston 10 and a wall of the piston chamber 21.

The electromechanical brake 100 further comprises an actuator housing 50. The actuator housing 50 serves, for example, as an enclosure for the electric motor 30 and/or the gear mechanism 60. The actuator housing 50 is arranged, and in one exemplary arrangement, fastened, on the brake carrier 20 with the formation of an interior 51. At least one fastening element 53, such as a screw element, can be used for fastening.

The electric drive or the electric motor 30 has an electrical connection in order to connect an electrical power cable 31 thereto. In one exemplary arrangement, the electrical connection has a socket 33 in order to receive a plug 32 which is assigned to the electrical power cable 31. The electrical connection is received in an opening in the actuator housing 50, and is accommodated tightly or largely tightly, in order to prevent dirt and/or moisture from penetrating into the actuator housing 50.

In the case of the electromechanical brake 100, a venting device 40 is provided, which is used to vent the piston chamber 21 with respect to an exterior 300. The exterior 300 is, for example, an environment outside the electromechanical brake 100. Atmospheric pressure prevails there, so that pressure equalization takes place between the piston chamber 21 and the exterior 300 through the venting device 40, for example when the actuating piston 10 is moved translationally in the direction of its piston axis 11 and/or there is an expansion of the gas in the piston chamber 21 due to an increase in temperature or a change in temperature. The exterior 300 can be a space in a region of a wheel brake and/or a wheel of a motor vehicle. For example, the exterior 300 is located in a region of a wheel house of a motor vehicle.

The venting device 40 has a venting opening 41, which is provided, for example, on the brake carrier 20 and is flow-connected on the one hand to the exterior 300 and on the other hand to the piston chamber 21. For example, the venting opening 41 is flow-connected to the piston chamber 21 via a flow passage 42, such as one or more flow channels. The flow passage 42 opens into a rear region of the piston chamber 21. As can be seen from FIG. 1, the venting opening 41 can be arranged on a portion 22 of the brake carrier 20 which is located outside the interior 51 of the actuator housing 50. In order to protect the ventilation opening 41 from the ingress of dirt and/or moisture, the venting opening 41 can be assigned a filter element.

Figure 2:
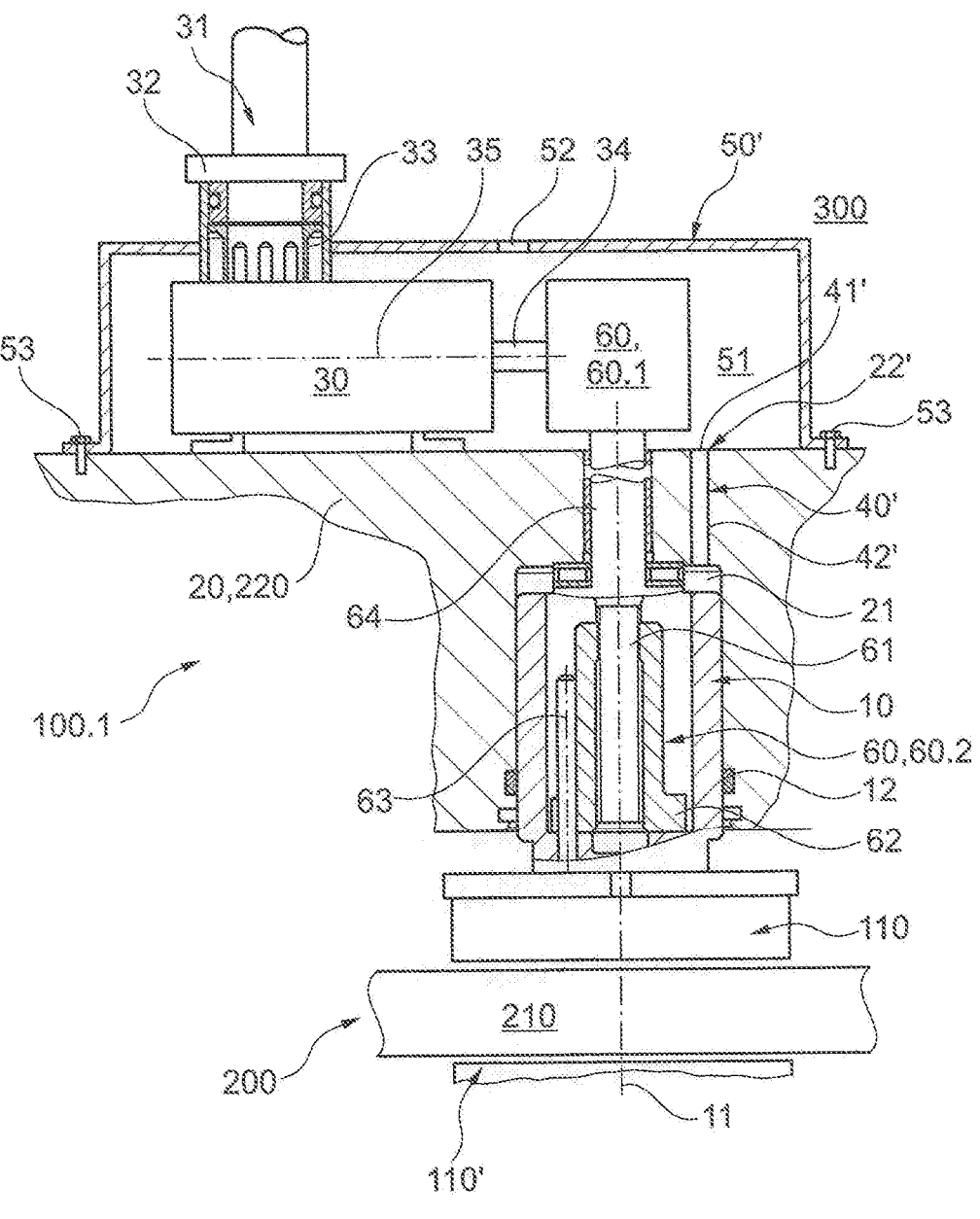
FIG. 2 shows the electromechanical brake of FIG. 1 with a further exemplary arrangement of a venting device for venting the piston chamber in a schematic representation as a partial section.

FIG. 2 shows a further possible arrangement of an electromechanical brake 100.1 in a schematic representation as a partial section. Components of the electromechanical brake 100.1 which are structurally or functionally identical to those of the electromechanical brake 100 of FIG. 1 are provided with the same reference signs; in this respect, reference is made to the description of the electromechanical brake 100 in FIG. 1. The electromechanical brake 100.1 can be a component of a disc brake, for example the disc brake 200 according to FIG. 1.

The electromechanical brake 100.1 in FIG. 2 differs from the electromechanical brake 100 in FIG. 1, among other things, in that a further exemplary arrangement of a venting device 40' is provided for venting the piston chamber 21 with respect to the exterior 300. The venting device 40' has a venting opening 41' which is arranged on a portion 22' of the brake carrier 20 which is arranged within an actuator housing 50'. The venting opening 41' is flow-connected to the piston chamber 21, for example via a flow passage 42' provided in the brake carrier 20. The actuator housing 50' can be the actuator housing 50 of the electromechanical brake 100 according to FIG. 1.

The actuator housing 50' is arranged on the brake carrier 20 in a gas-permeable manner in order to allow a gas exchange between the interior 51 of the actuator housing 50' and the exterior 300. In this way, with the interposition of the interior 51, pressure equalization between the piston chamber 21 and the exterior 300 is given. The venting opening 41' is arranged so that it is protected from dirt and/or moisture by the actuator housing 50', and this counteracts the entry of dirt and/or moisture into the piston chamber 21.

Additionally or alternatively, the actuator housing 50' can have an opening 52, such as a slot or gap, via which a gas exchange between the interior 51 of the actuator housing 50' and the exterior 300 can be achieved.

Figure 3:
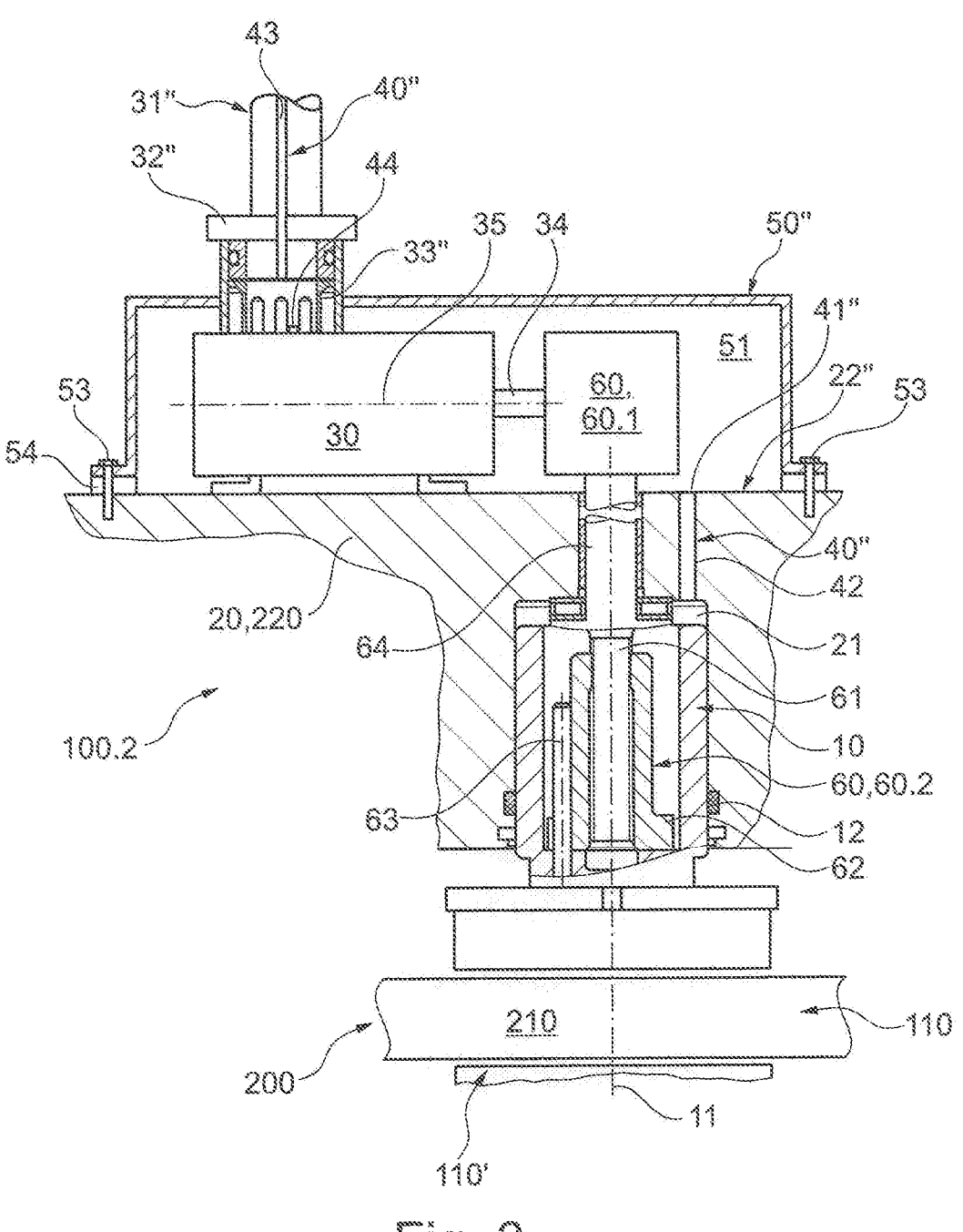
FIG. 3 shows the electromechanical brake of FIG. 1 with a further exemplary arrangement of a venting device for venting the piston chamber in a schematic representation as a partial section.

FIG. 3 shows a further possible embodiment of an electromechanical brake 100.2 in a schematic representation as a partial section. Components of the electromechanical brake 100.2 which are structurally or functionally identical to those of the electromechanical brake 100 of FIG. 1 are provided with the same reference signs; in this respect, reference is made to the description of the electromechanical brake 100 in FIG. 1. The electromechanical brake 100.2 can be a component of a disc brake, for example the disc brake 200 according to FIG. 1.

The electromechanical brake 100.2 in FIG. 3 differs from the electromechanical brake 100.1 in FIG. 2, among other things, in that a further exemplary arrangement of a venting device 40" is provided for venting the piston chamber 21. The venting device 40" has a venting opening 41" which is arranged on a portion 22" of the brake carrier 20 which is arranged within an actuator housing 50". The venting opening 41" is flow-connected to the piston chamber 21, for example via a flow passage 42" provided in the brake carrier 20.

The actuator housing 50" can be the actuator housing 50 of the electromechanical brake 100 according to FIG. 1. The venting opening 40" can correspond to the venting opening 40' of the venting device 40' in FIG. 2. Furthermore, the flow passage 42" can correspond to the flow passage 42' of the venting device 40' in FIG. 2.

A venting line 43 is provided in the venting device 40". The venting line 43 is intended to be laid in a spatial region remote from the electromechanical brake 100.2, for example in order to achieve a gas exchange from there with the piston chamber 21 of the electromechanical brake 100.2 and thus to allow pressure equalization between the piston chamber 21 and this region.

The venting line 43 is assigned to the electrical power cable 31 (FIG. 1), which is used to supply electrical energy to the electric motor 30, for example. For example, the venting line 43 is arranged along the electrical power cable 31.

As can be seen from FIG. 3, instead of the electrical power cable 31, an electrical power cable 31" can be provided, in which the venting line 43 is integrated. The venting line 43 is one of the individual lines of the electrical power cable 31" and is surrounded, for example, by a sheathing of the electrical power cable 31". The electrical power cable 31" is electrically connected to the electric motor 30 via a plug-and-socket connection. A socket 33" is assigned to the electric motor 30 and a plug 32" is assigned to the electrical power cable 31".

The plug 32" has a plurality of contact elements for making electrical contact with corresponding counter elements of the socket 33". A tube is arranged between them, which is flow-connected on the one hand to the venting line 43 and on the other hand to the interior 51 of the actuator housing 50". The tube is shown only schematically in FIG. 3 and is provided with the reference sign 44. In addition, a further tube can also be assigned to the socket 33".

The actuator housing 50" is arranged on the brake carrier 20 in a sealing manner, and in one particular arrangement in a gas-tight manner. For this purpose, a separate sealing element 54 can be provided. The actuator housing 50" is designed without such an opening, which is provided, for example, as an opening 52 of the actuator housing 50" in FIG. 2. The pressure equalization thus takes place exclusively via the venting line 43, which can be laid with a free end in a spatially spaced region of the motor vehicle.

Figure 4:
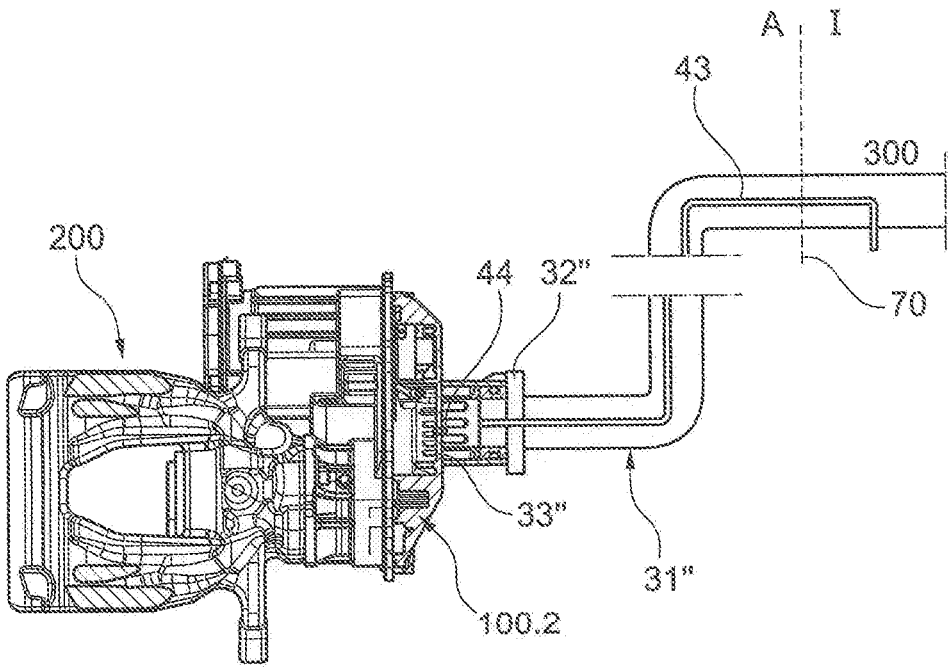
FIG. 4 shows the electromechanical brake of FIG. 3 with a venting line laid in a vehicle interior.

FIG. 4 shows, by way of example and schematically, the electromechanical brake 100.2 as part of the disc brake 200. There, the venting line 43 is shown schematically in a laid state on a motor vehicle by way of example. A dividing region between a vehicle interior I and a vehicle exterior A is indicated, for example, by a dashed line 70 provided there.

The vehicle interior I can be the passenger compartment of the motor vehicle. The vehicle exterior A is, for example, the region of a wheel brake and/or the associated wheel arch of the motor vehicle. For example, the vehicle exterior A is arranged where there is moisture and/or protection during vehicle operation. The vehicle interior I is to be seen as such a space which is substantially free of moisture and/or dirt.

In FIG. 4, the venting line 43 is laid, for example as an integral part of the electrical power cable 31", for supplying electrical energy to the electric motor 30 into the vehicle interior I. As a result, the inlet or the free end of the venting line 43 is arranged in a dirt-protected and/or moisture-protected space which forms the exterior 300, with respect to which ventilation or pressure equalization takes place with respect to the piston chamber 21.

In the present description, reference to a specific aspect or a specific exemplary arrangement or a specific design means that a specific feature or a specific property described in connection with the respective aspect or the respective arrangement or the respective design is at least contained therein but does not necessarily have to be contained in all aspects or arrangements or designs of the disclosure. It must be expressly noted that any combination of the different features and/or structures and/or properties described in relation to the disclosure are included in the disclosure unless expressly or clearly contradicted by the context.

The use of some or all of the examples or an exemplary mode of expression in the text is only intended to illuminate the disclosure and does not constitute a limiting effect on the scope of the disclosure, unless stated otherwise. In addition, no mode of expression or wording in the description is to be understood to mean that it refers to an element which is not claimed but essential to the practice of the disclosure.

The invention claimed is:

1. An electromechanical brake for a motor vehicle, comprising:
   an actuating piston configured to move translationally along a piston axis to actuate at least one brake shoe,
   a brake carrier having a gas-containing piston chamber in which the actuating piston is received,
   an electric motor for driving the actuating piston;
   an actuator housing enclosing the electric motor and mounted to the brake carrier to form an interior, and
   a venting device extending from a side of the piston chamber opposite the at least one brake shoe,
   wherein the venting device comprises a venting line that is flow-connected to the interior of the actuator housing, and
   wherein the actuator housing is sealed in a gas-tight manner to the brake carrier such that pressure equalization between the piston chamber and an exterior occurs exclusively via the venting line.

2. The brake according to claim 1, wherein the venting device comprises a venting opening which is provided on the brake carrier and is flow-connected on the one hand to the exterior and on another hand to the piston chamber.

3. The brake according to claim 2, wherein the venting opening is arranged on a portion of the brake carrier which is located outside the interior.

4. The brake according to claim 1, wherein the venting device comprises the venting line which is intended to be laid in a vehicle interior.

5. The brake according to claim 4, wherein the venting line is arranged along an electrical power cable which is used to supply electrical energy to the electric motor.

6. A disc brake for a motor vehicle, comprising a brake disc and an electromechanical brake according to any of claim 1, wherein the brake is set up via the actuating piston and at least one brake shoe to act on the brake disc.

7. A brake system for a motor vehicle, comprising
an electromechanical brake for actuating at least one brake shoe and comprising an electrical control device; wherein the electromechanical brake comprises:
an actuating piston which is set up to be moved translationally in a direction of a piston axis in order to actuate the at least one brake shoe,
a brake carrier having a gas-containing piston chamber in which the actuating piston is received such that the actuating piston can be moved translationally in the direction of the piston axis,
an electric motor for driving the actuating piston; and
a venting device extending from the piston chamber for venting the piston chamber with respect to an exterior of the piston chamber, the venting device comprising a venting line that is flow connected to an interior of an actuator housing that serves as an enclosure for the electric motor;
wherein the electrical control device is for controlling the electric motor of the electromechanical brake, wherein the control device and the electric motor are set up to set a braking force exerted by the at least one brake shoe according to one or more specified values.

8. A motor vehicle according to claim 7 and, a vehicle interior, wherein the actuator housing is arranged on the brake carrier with the formation of the interior; and wherein the venting opening is arranged on a portion of the brake carrier which is located within the interior and the actuator housing is arranged in a gas-tight manner on the brake carrier and the venting line is laid in the vehicle interior.

9. The motor vehicle of claim 8, wherein the venting line is arranged along an electrical power cable which is used to supply electrical energy to the electric motor.

10. The motor vehicle of claim 9, wherein the venting line is integrated in the electrical power cable.

11. An electromechanical brake for a motor vehicle, comprising:
an actuating piston which is set up to be moved translationally in a direction of a piston axis in order to actuate at least one brake shoe,
a brake carrier having a gas-containing piston chamber in which the actuating piston is received such that the actuating piston can be moved translationally in the direction of the piston axis,
an electric motor for driving the actuating piston; and
a venting device extending from a side of the piston chamber opposite of the at least one brake shoe for venting the piston chamber with respect to an exterior of the piston chamber,
wherein the venting device comprises a venting opening which is provided on the brake carrier and is flow-connected on the one hand to the exterior and on another hand to the piston chamber, and further comprising an actuator hosing which serves as an enclosure for the electric motor and is arranged on the brake carrier with formation of an interior,
wherein the venting opening is arranged on a portion of the brake carrier which is located within the interior.

12. The brake according to claim 11, wherein the actuator housing has at least one opening to the exterior.

13. The brake according to claim 11, wherein the actuator housing is arranged in a gas-tight manner on the brake carrier and the venting device comprises a venting line which is flow-connected to the interior of the actuator housing and is intended for installation in a vehicle interior.

14. The brake according to claim 13, wherein the venting line is arranged along an electrical power cable which is used to supply electrical energy to the electric motor.

15. The brake according to claim 14, wherein the venting line is integrated in the electrical power cable.

16. The brake according to claim 15, wherein the electrical power cable is electrically connected to a socket of the electric motor via a plug, and wherein the plug has a plurality of contact elements for making electrical contact with corresponding counter elements of the socket and a tube is arranged therebetween, which is flow connected on one hand to the venting line and on another hand to the interior of the actuator housing.

17. The brake according to either claim 14, wherein the electrical power cable is electrically connected to a socket of the electric motor via a plug, and wherein the plug has a plurality of contact elements for making electrical contact with corresponding counter elements of the socket and a tube is arranged between them, which is flow-connected on the one hand to the venting line and on another hand to the interior of the actuator housing.

18. The brake according to claim 11, wherein the actuator housing is fastened to the brake carrier in a gas-permeable manner.

19. The brake according to claim 11, wherein the venting device comprises a venting line which is intended to be laid in a vehicle interior.

* * * * *